US009479542B2

(12) United States Patent
Janssens et al.

(10) Patent No.: US 9,479,542 B2
(45) Date of Patent: Oct. 25, 2016

(54) METHOD AND APPARATUS FOR INTERCONNECTING A USER AGENT TO A CLUSTER OF SERVERS

(75) Inventors: Nico Janssens, Putte (BE); Claudio Forlivesi, Sint-Lambrechts-Woluwe (BE); Philippe Dobbelaere, Ranst (BE); Alessandro Duminuco, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 270 days.

(21) Appl. No.: 14/233,594

(22) PCT Filed: Jul. 9, 2012

(86) PCT No.: PCT/EP2012/063398
§ 371 (c)(1),
(2), (4) Date: Apr. 17, 2014

(87) PCT Pub. No.: WO2013/010847
PCT Pub. Date: Jan. 24, 2013

(65) Prior Publication Data
US 2014/0215031 A1    Jul. 31, 2014

(30) Foreign Application Priority Data
Jul. 18, 2011   (EP) .................................... 11290327

(51) Int. Cl.
*H04L 29/06*   (2006.01)
*H04L 29/08*   (2006.01)
*H04L 12/24*   (2006.01)

(52) U.S. Cl.
CPC ....... *H04L 65/1006* (2013.01); *H04L 41/0654* (2013.01); *H04L 65/1066* (2013.01);
(Continued)

(58) Field of Classification Search
None
See application file for complete search history.

(56) References Cited

U.S. PATENT DOCUMENTS 8,095,681 B2 *   1/2012   Yumoto ............. H04L 65/1006
                                                       370/230
8,713,351 B2 *   4/2014   Han ..................... H04L 65/105
                                                       713/181

(Continued)

FOREIGN PATENT DOCUMENTS

EP          2 066 098 A1       6/2009

OTHER PUBLICATIONS

3GPP: "3$^{rd}$ Generation Partnership Project; Technical Specification Group Services and System Aspects; Feasibility Study on IMS Evolution; (Release 9)," 3GPP TR 23.812 V1.1.5, XP050515595, pp. 1-59, May 2011.

(Continued)

*Primary Examiner* — Patrice Winder
(74) *Attorney, Agent, or Firm* — Fay Sharpe, LLP

(57) ABSTRACT

An apparatus (CEG) for interconnecting a user agent to a cluster of servers, the apparatus comprising a first protocol agent configured to exchange first messages with said user agent according to a SIP protocol, wherein said apparatus has the role of a User Agent Server; a second protocol agent configured to exchange second messages with a selected server from among said cluster of servers according to the SIP protocol, wherein said apparatus has the role of a User Agent Client; interconnection means for relaying messages from among said first messages and said second messages between said first protocol agent and said second protocol agent; wherein said second protocol agent is further configured to terminate elasticity control messages received from said cluster of servers.

20 Claims, 11 Drawing Sheets

(52) U.S. Cl.
CPC ....... *H04L67/1004* (2013.01); *H04L 67/1029* (2013.01); *H04L 67/1034* (2013.01); *H04L 67/14* (2013.01); *H04L 67/142* (2013.01); *H04L 67/148* (2013.01)

(56) References Cited

U.S. PATENT DOCUMENTS

| | | | | |
|---|---|---|---|---|
| 8,775,628 | B2* | 7/2014 | Francis | H04L 67/1002 709/224 |
| 8,881,167 | B2* | 11/2014 | Iyengar | H04L 67/1002 709/226 |
| 9,143,558 | B2* | 9/2015 | Blander | H04L 67/1029 |
| 2008/0147551 | A1* | 6/2008 | Connelly | H04L 65/1006 705/44 |
| 2009/0245113 | A1* | 10/2009 | Kamiya | H04L 65/80 370/238 |
| 2010/0106842 | A1* | 4/2010 | Cosmadopoulos | H04L 65/80 709/228 |

OTHER PUBLICATIONS

"3$^{rd}$ Generation Partnership Project; Technical Specification Group Services and System Aspects; IP Multimedia Subsystem (IMS); Stage 2 (Release 11)," 3GPP TS 23.228 V11.0.0, XP050476343, pp. 1-272, Mar. 2011.
International Search Report for PCT/EP2012/063398 dated Nov. 2, 2012.
PCT Pat App PCT/EP2012/063398; Written Opinion of the International Searching Authority, mailed Nov. 2, 2012, 5 pp.
European Pat. App. No. 11290327.3, Extended European Search Report, mailed Dec. 5, 2011, 6 pp.

* cited by examiner

METHOD AND APPARATUS FOR INTERCONNECTING A USER AGENT TO A CLUSTER OF SERVERS

FIELD OF THE INVENTION

The present invention pertains to the field of networks adapted to support Session Initiation Protocol (SIP) sessions.

BACKGROUND

Virtualization technologies enable computing systems to handle surges of load by provisioning additional virtual machines on an as-needed basis. Hence, instead of over-dimensioning a computing system to handle (potential) peak loads, cloud computing enables these computing systems to acquire and release resources according to their present needs. Scalable systems of this type will hereinafter be referred to as "elastic" systems.

The Session Initiation Protocol (SIP), used for setting up and controlling multimedia communication sessions between end points over a packet-based network such as the Internet, is a stateful protocol. This means that the participants in a protocol exchange have to remember the state of the exchange to adequately respond to protocol incidents. Moreover, the majority of SIP servers are stateful—for instance because they maintain "dialogs" representing the SIP relationship between two SIP User Agents (UAs), which persist for some time. In addition, SIP can run over a variety of transport protocols, including the Transport Control Protocol (TCP), which is itself a state-sensitive protocol.

SUMMARY

SIP UAs are usually tightly coupled to a specific SIP server for some time, which complicates dynamic acquisition and/or release of SIP servers in response to load changes. This tight coupling can also be observed when a call traverses multiple domains. If this is the case, the collaborating (stateful) proxy servers of the different domains are usually tightly coupled to each other for some time, which again complicates the implementation of safe dynamic elasticity behavior in one or all of the affected SIP domains. Finally, the installed base of SIP clients is fragmented and not fully compliant with the latest standards.

Hence, there is a need for a method to decouple SIP servers from their (non-elastic) counterparts, as well as from SIP UAs, so as to enable dynamically scaling out and clustering of (stateful) SIP servers without compromising ongoing calls.

It is an object of the present invention to promote easy adoption of elastic SIP clusters by concealing SIP UAs and (non-elastic) SIP servers from protocol changes and flow-control messages needed to build dynamically scaling (stateful) SIP clusters.

According to a first aspect of the present invention, there is provided a first apparatus for interconnecting a user agent to a cluster of servers, the apparatus comprising:
  a first protocol agent configured to exchange first messages with said user agent according to a SIP protocol, wherein said apparatus has the role of a User Agent Server;
  a second protocol agent configured to exchange second messages with a selected server from among said cluster of servers according to the SIP protocol, wherein said apparatus has the role of a User Agent Client;
  interconnection means for relaying messages from among said first messages and said second messages between said first protocol agent and said second protocol agent;
  wherein said second protocol agent is further configured to terminate elasticity control messages received from said cluster of servers.

The first apparatus will hereinafter be referred to as a Client Elasticity Gateway (CEG).

In an embodiment of the present invention, the CEG further comprises logic configured to select said selected server from among said cluster of servers in accordance with a load balancing scheme.

In an embodiment of the present invention, the CEG further comprises logic configured to select another server from among said cluster of servers in the event of a failure of said selected server.

According to a first aspect of the present invention, there is provided a second apparatus for interconnecting a cluster of servers to a SIP server, the apparatus comprising:
  a first protocol agent configured to exchange first messages with a selected server from among said cluster of servers according to a SIP protocol, wherein said apparatus has the role of a User Agent Server;
  a second protocol agent configured to exchange second messages with a SIP server according to the SIP protocol, wherein said apparatus has the role of a User Agent Server;
  means for relaying messages from among said first messages and said second messages between said first protocol agent and said second protocol agent;
  wherein said first protocol agent is further configured to terminate elasticity control messages received from said cluster of servers.

The second apparatus will hereinafter be referred to as a Server Elasticity Gateway (SEG).

In an embodiment of the present invention, the SEG further comprises logic configured to select said selected server from among said cluster of servers in accordance with a load balancing scheme.

In an embodiment of the present invention, the SEG further comprises logic configured to select another server from among said cluster of servers in the event of a failure of said selected server.

According to another aspect of the present invention, there is provided a method for interconnecting a user agent to a selected server from among a cluster of servers, said method comprising at a Client Elasticity Gateway device:
  relaying messages between said user agent and said selected server by
    exchanging first messages with said user agent according to a SIP protocol, wherein said Client Elasticity Gateway device has the role of a User Agent Server; and
    exchanging second messages with said selected server according to the SIP protocol, wherein said Client Elasticity Gateway device has the role of a User Agent Client;
  wherein payloads of incoming first messages are transferred to outgoing second messages and vice versa; and
    terminating elasticity control messages received from said cluster of servers.

In an embodiment, the method according to the present invention further comprises selecting said selected server from among said cluster of servers in accordance with a load balancing scheme.

In an embodiment, the method according to the present invention further comprises providing fail-over support by selecting another server from among said cluster of servers in the event of a failure of said selected server.

According to another aspect of the present invention, there is provided a method for interconnecting a first server to a selected one from among a cluster of servers, said method comprising at a Server Elasticity Gateway device:
relaying messages between said first server and said selected server by
exchanging first messages with said first server according to a SIP protocol; and
exchanging second messages with said selected server according to the SIP protocol;
wherein payloads of incoming first messages are transferred to outgoing second messages and vice versa; and
terminating elasticity control messages received from said cluster of servers.

In an embodiment, the method according to the present invention further comprises selecting said selected server from among said cluster of servers in accordance with a load balancing scheme.

In an embodiment, the method according to the present invention further comprises providing fail-over support by selecting another server from among said cluster of servers in the event of a failure of said selected server.

According to another aspect of the present invention, there is provided a computer program configured to cause a programmable device to carry out any of the methods as described above.

BRIEF DESCRIPTION OF THE FIGURES

Some embodiments of apparatus and/or methods in accordance with embodiments of the present invention are now described, by way of example only, and with reference to the accompanying drawings, in which.

DETAILED DESCRIPTION OF EMBODIMENTS

The present invention is based inter alia on the insight that a dedicated SIP Client Elasticity Gateway (SIP CEG) may be used to decouple SIP UAs from the (stateful) SIP servers of an elastic SIP cluster.

Figure 1:
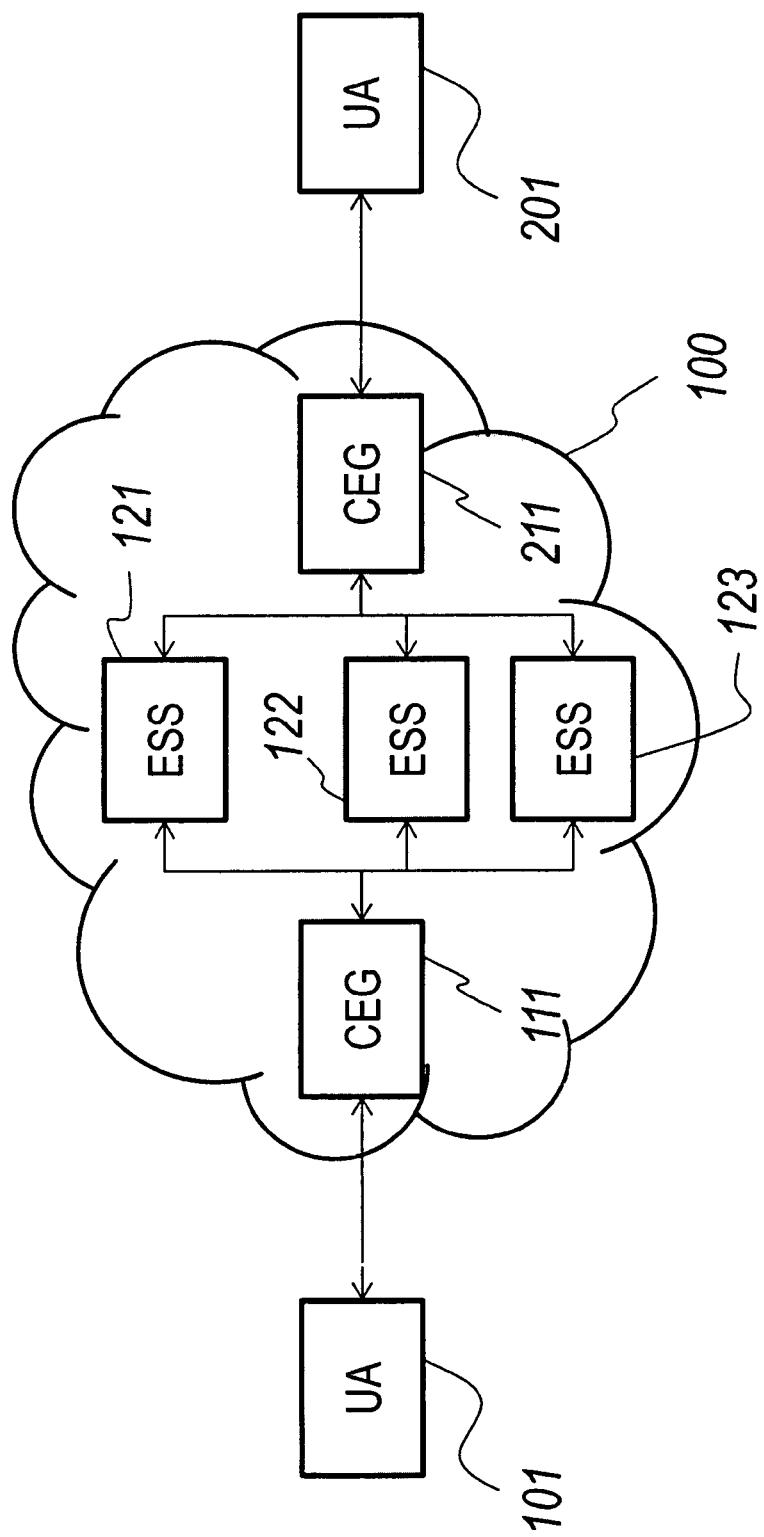
FIG. 1 illustrates an exemplary network comprising a single SIP domain, in which the present invention may be deployed.

FIG. 1 illustrates an exemplary network comprising two exemplary user agents 101, 201 interconnected by a single SIP domain 100. The SIP domain 100 comprises a first CEG 111 and a second CEG 211, shielding a server cluster. Without loss of generality, the cluster is illustrated as containing three elastic SIP servers 121-123.

Without loss of generality, we consider the interaction between the first SIP CEG 111 and the topologically adjacent UA 101. SIP CEG 111 plays the role of User Agent Server (UAS) in all its communication with the UA 101, and the role of User Agent Client (UAC) in its relation with the SIP servers 121-123 of the elastic SIP cluster. The SIP CEG 111 thus conceals the elastic SIP servers 121-123 from the client 101 by acting as a single SIP server. It may include load balancing support (possibly similar to the load balancers of existing SIP farms), and can also be equipped with failover support (to cope with SIP server crashes). Furthermore, the SIP CEG 111 terminates elasticity control messages originating from the elastic SIP cluster 121-123, so it conceals the dynamics of the elastic SIP cluster from the UA 101—including instructions to redirect messages to another SIP server.

Traditional load balancers only process incoming messages. Since the SIP CEG 111 seeks to control all access to the elastic SIP cluster 121-123, it also forwards outgoing messages to the UA 101. Hence, the UA 101 sends responses back to the SIP CEG 111 instead of the actual SIP server that previously processed this message. This enables the CEG 111 to transparently redirect messages when new SIP servers are acquired, or when redundant SIP servers are released.

The interaction between the second SIP CEG 211 and the topologically adjacent UA 201 is fully analogous.

It is advantageous to deploy CEG instances close to the SIP UA—on a Femtocell, on a Home Gateway, or in the most extreme case even as a separate service on the SIP UA itself. By deploying (multiple) CEGs close to the client (instead of only a few CEGs close to the elastic SIP servers), the CEGs have to meet less strict scalability and high-availability requirements. Since only a few UAs depend on their functionality, the impact of a failure is limited.

A CEG deployed close to the elastic SIP servers, in contrast, would accommodate a greater number of UAs, and would therefore have to meet more stringent scalability and high-availability requirements.

The present invention is also based on the insight that a dedicated SIP Server Elasticity Gateway (SIP SEG) can be used to decouple SIP servers from peers that are non-elastic or that belong to a different domain.

Figure 2:
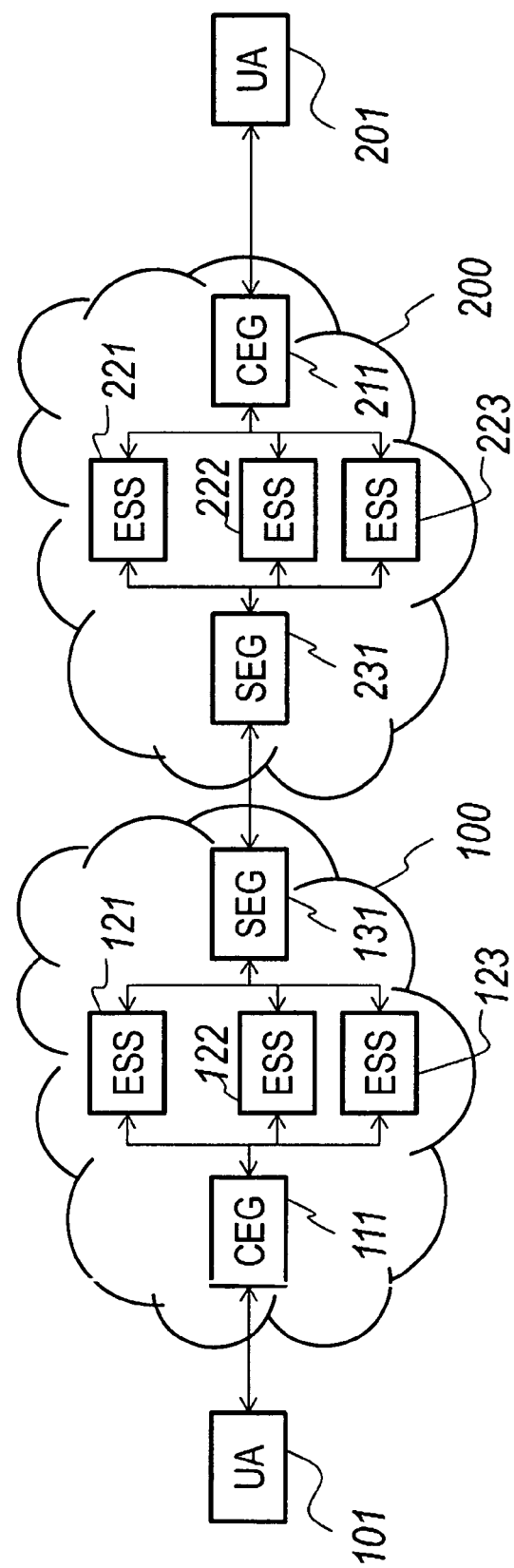
FIG. 2 illustrates an exemplary network comprising two SIP domains, in which the present invention may be deployed.

FIG. 2 illustrates an exemplary network comprising two exemplary user agents 101, 201 interconnected by several SIP domains. Without loss of generality, two interconnected SIP domains 100, 200 are shown. Each of the illustrated SIP domains 100, 200 comprises a CEG 111, 211 facing the user agent, and a SEG 131, 231 facing the domain boundary. The CEG and the SEG of each domain 100, 200 shields a server cluster. Without loss of generality, each cluster is illustrated as containing three elastic SIP servers 121-123, 221-223.

The role of the SEG 131, 132 is similar to the CEG 111, 211; it redirects incoming messages to the appropriate server, it terminates elasticity control messages originating from the elastic SIP servers 121-123, 221-223, and it forwards messages to the next hop (to conceal the elastic SIP server that actually processed this message, and to make sure responses are sent back to the SEG).

Although the objectives of the CEG and the SEG are similar, their implementation and deployment model is slightly different. This has been the main reason to distinguish between the CEG (which decouples elastic SIP servers from SIP UAs) and the SEG (which decouples elastic SIP servers from peers that are non-elastic, or that belong to a different domain).

Figure 3:
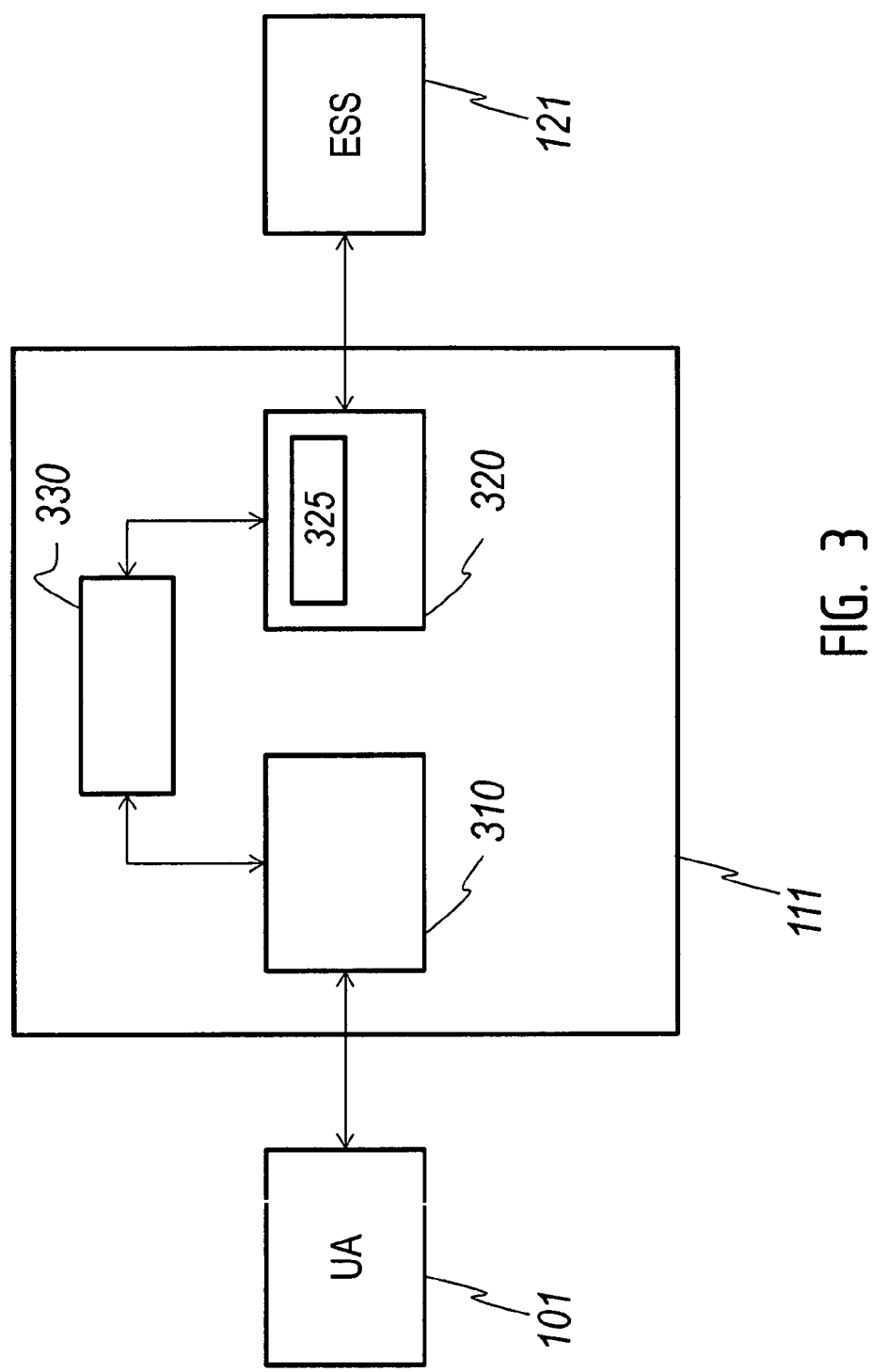
FIG. 3 provides a schematic illustration of a first apparatus according to an embodiment of the present invention.

An exemplary implementation of a CEG 111 according to an embodiment of the present invention is schematically illustrated in FIG. 3.

For clarity reasons, elements merely responsible for enabling communication with other entities at protocol layers up to the transport layer level, have not been illustrated. The skilled person will understand that a CEG 111 in accordance with the present invention will be implemented in or as an apparatus that comprises the necessary hardware and software to this effect.

As illustrated, the CEG comprises a first protocol agent 310 configured to exchange messages with a user agent 101 according to the SIP protocol, a second protocol agent 320 configured to exchange messages with an elastic SIP server 121 that belongs to an elastic server cluster, and interconnection means 330 for relaying messages between the aforementioned protocol agents 310, 320. The second protocol agent 320 is further configured to terminate elasticity control messages received from the cluster, and may for this purpose comprise an elasticity subagent 325. The skilled person will understand that the first protocol agent 310, the second protocol agent 320, the elasticity subagent 325, and the interconnection means 330 may be implemented as one or more dedicated hardware blocks, or as a combination of dedicated and configurable hardware, with one or more pieces of software representing the aforementioned entities.

Figure 4:
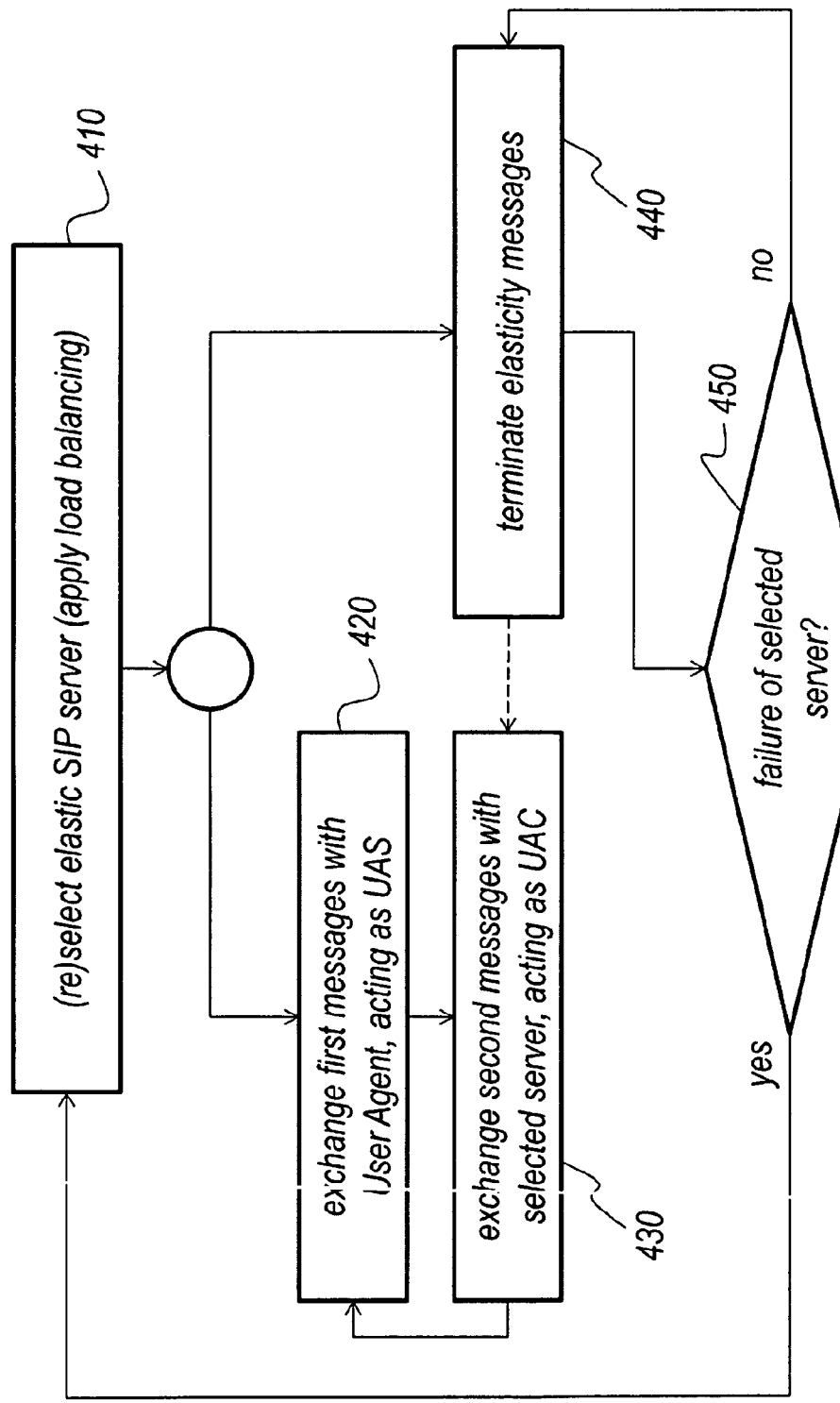
FIG. 4 presents a flow chart of a method according to an embodiment of the present invention.

FIG. 4 present a flow chart of steps performed at a CEG 111 in an exemplary method according to an embodiment of the present invention. Although the steps of the method are illustrated and described in a particular order, this is done for clarity reasons only, and is not intended to limit the invention in any way.

In a preliminary step 410, applicable when the transaction is initiated from the side of the UA 101, an elastic SIP server 121 from among the server cluster may be selected, preferably by applying a load balancing algorithm. In a second step 420 and a third step 430 messages are exchanged between the CEG 111 and the UA 101 on the one hand, and between the CEG 111 and the selected server 121 on the other hand. At this stage, messages are relayed via the CEG 111 between the UA 101 and the selected server 121 as appropriate. This stage persists as long as the SIP session requires it. Meanwhile, in a fourth step 440, the CEG 111 terminates (generates and receives) elasticity messages, and updates the configuration of those parts of the CEG 111 that communicate with the selected server 121 accordingly. If failure of the selected server 121 is detected 450, a new elastic server may be selected 410, and the operation of the CEG 111 continues with the newly selected server. It must be noted that support for failure recovery at the CEG 111 is optional. As an alternative to local failure recovery support, the CEG 111 functionality may be limited to interacting with an external Elastic Control System (ECS, not shown), which may be configured to instruct the CEG 111 to suspend a conversation managed by a first ESS and to resume it at another ESS in response to a failure event. Details of the ECS are provided in a patent application "Method for transferring state information pertaining to a plurality of SIP conversations" in the name of the applicant, filed on the same day as the present application, the content of which is hereby incorporated by reference.

Figure 5:
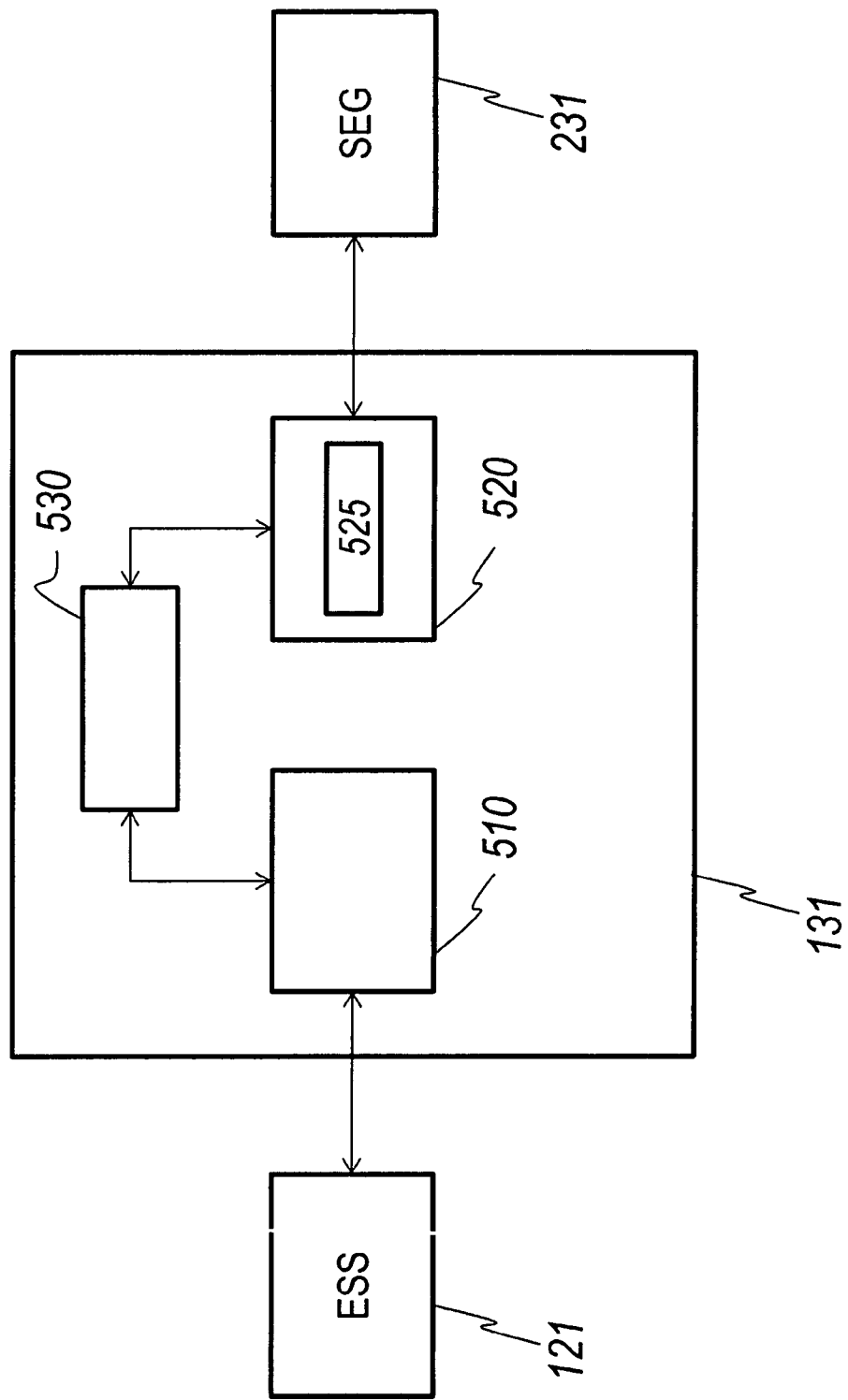
FIG. 5 provides a schematic illustration of a second apparatus according to an embodiment of the present invention.

An exemplary implementation of a SEG 131 according to an embodiment of the present invention is schematically illustrated in FIG. 5.

For clarity reasons, elements merely responsible for enabling communication with other entities at protocol layers up to the transport layer level, have not been illustrated. The skilled person will understand that a SEG 131 in accordance with the present invention will be implemented in or as an apparatus that comprises the necessary hardware and software to this effect.

As illustrated, the SEG comprises a first protocol agent 510 configured to exchange messages with an elastic SIP server 121 that belongs to an elastic server cluster, a second protocol agent 520 configured to exchange messages with a peer 231, and interconnection means 530 for relaying messages between the aforementioned protocol agents 510, 520. The second protocol agent 520 is further configured to terminate elasticity control messages received from the cluster, and may for this purpose comprise an elasticity subagent 525. The skilled person will understand that the first protocol agent 510, the second protocol agent 520, the elasticity subagent 525, and the interconnection means 530 may be implemented as one or more dedicated hardware blocks, or as a combination of dedicated and configurable hardware, with one or more pieces of software representing the aforementioned entities.

Figure 6:
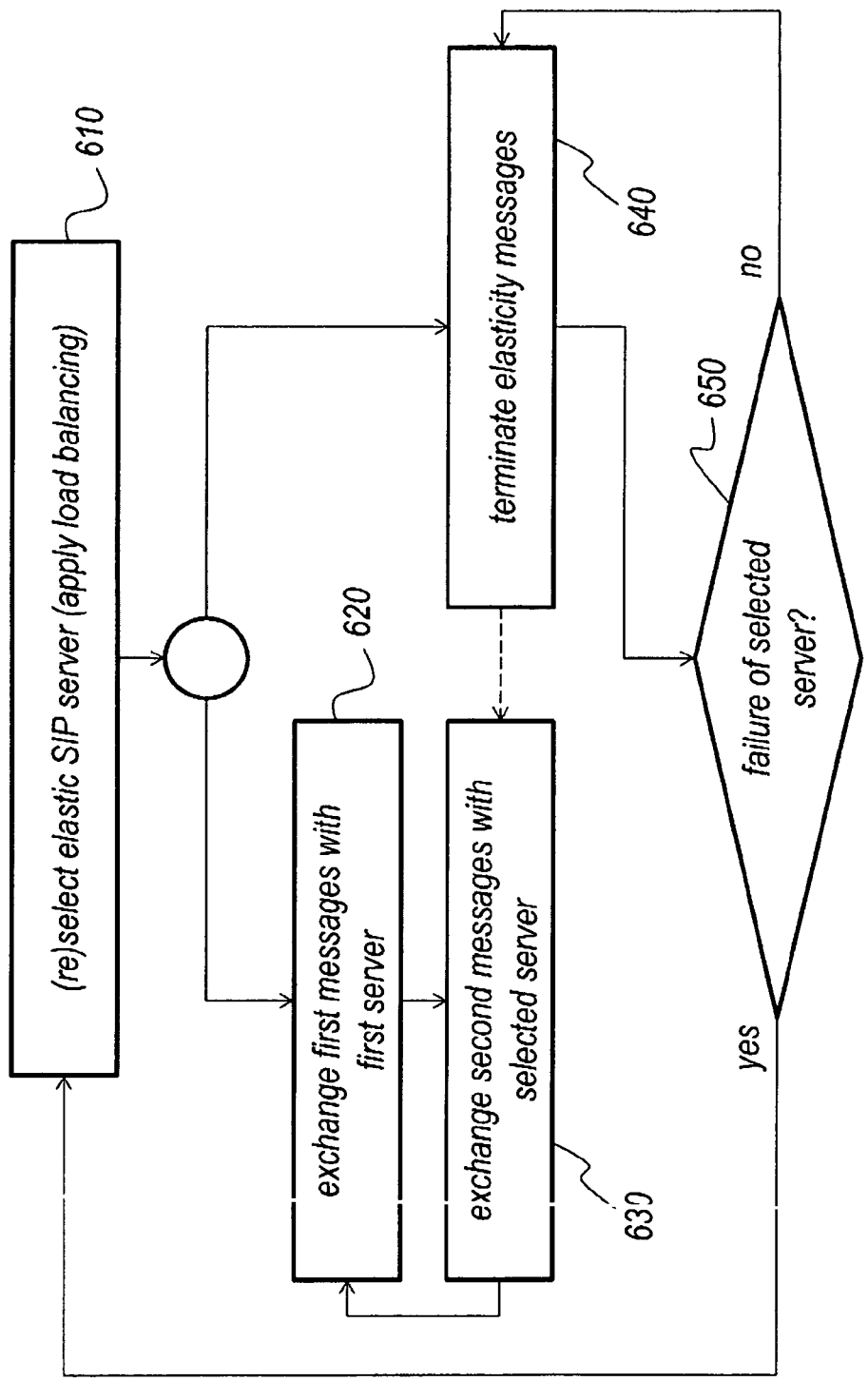
FIG. 6 presents a flow chart of a method according to another embodiment of the present invention.

FIG. 6 present a flow chart of steps performed at a CEG 131 in an exemplary method according to an embodiment of the present invention. Although the steps of the method are illustrated and described in a particular order, this is done for clarity reasons only, and is not intended to limit the invention in any way.

In a preliminary step 610, applicable when the transaction is initiated from the side of the peer 231, an elastic SIP server 121 from among the server cluster may be selected, preferably by applying a load balancing algorithm. In a second step 620 and a third step 630 messages are exchanged between the SEG 131 and the peer 231 on the one hand, and between the SEG 131 and the selected server 121 on the other hand. At this stage, messages are relayed via the SEG 131 between the peer 231 and the selected server 121 as appropriate. This stage persists as long as the SIP session requires it. Meanwhile, in a fourth step 640, the SEG 131 terminates (generates and receives) elasticity messages, and updates the configuration of those parts of the SEG 131 that communicate with the selected server 121 accordingly. If failure of the selected server 121 is detected 650, a new elastic server may be selected 610, and the operation of the SEG 131 continues with the newly selected server. It must be noted that support for failure recovery at the SEG 131 is optional. As an alternative to local failure recovery support, the CEG 131 functionality may be limited to interacting with an external ECS, which may be configured to instruct the SEG 131 to suspend a conversation managed by a first ESS and to resume it at another ESS in response to a failure event.

Interactions between the user agents, the CEG, and the SEG are now further explained with reference to the exemplary protocol exchanges illustrated in FIGS. 7-9.

Figure 7:
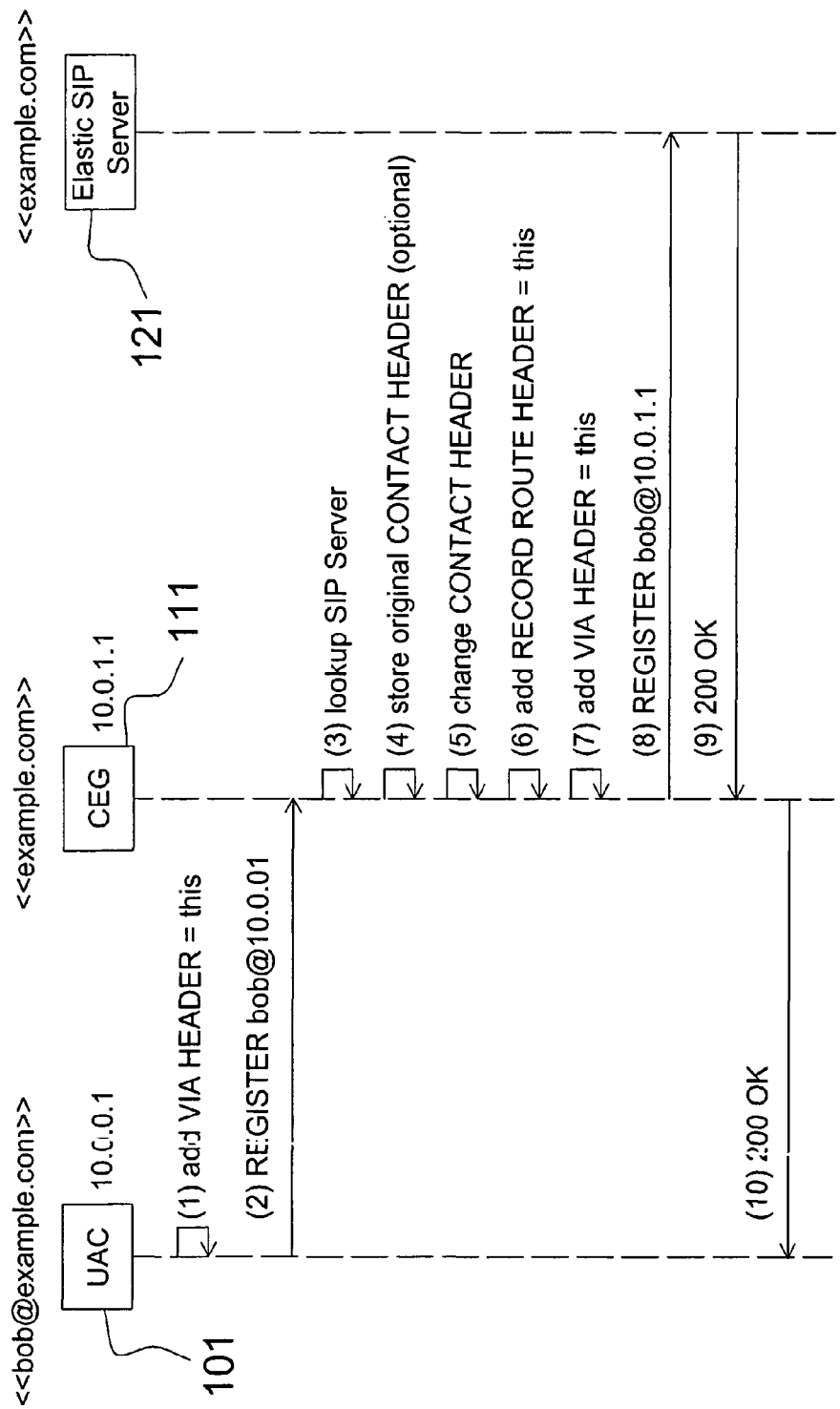
FIG. 7 illustrates a SIP protocol exchange between a user agent and a SIP server via an apparatus according to an embodiment of the present invention.

FIG. 7 illustrates a SIP protocol exchange, in particular the registration of a user agent 101, between the user agent 101 and an elastic SIP server 121 via a CEG 111 according to an embodiment of the present invention.

In order to decouple SIP UAs from the (stateful) SIP servers of an elastic SIP cluster by means of the CEG, all communication directed to a SIP UA need to pass the UA's CEG first. In a preferred embodiment, the CEG therefore updates all "REGISTER" requests to replace the UA's contact address with its own—and thus publishes itself as a contact on the client's behalf. This way the CEG will intercept all messages directed to the UA's contact. To be able to later dispatch these incoming requests, the CEG can store the UA's contact address locally, or it can encode this address in the updated contact header.

A UA 101 sends every REGISTER request to its local CEG 111 (which may be registered as outbound proxy, or could be resolved using DNS). The CEG 111 in turn replaces the contact address of the UA 101 with its own address. The original address of the UA 101 can be stored locally by the CEG 111, or the CEG 111 can encode this address in the updated contact header (e.g. by using the "rinstance" parameter).

Next, the local CEG 111 selects the appropriate SIP server (registrar) 121 to process this request (e.g. based on the current load of all SIP servers 121-123). This may involve the use of DNS SRV, NAPTR, A and/or AAAA records, as well as other existing techniques to spread load over a cluster of nodes. Before sending the modified REGISTER request to the selected SIP server 121, the CEG 111 adds a VIA header and a RECORD-ROUTE header to the request, so as to make sure responses and subsequent requests will pass the CEG 111 as well. The SIP server 121 stores the updated contact header in its location service, and sends a response back to the UA 101 via the CEG 111.

Figure 8:
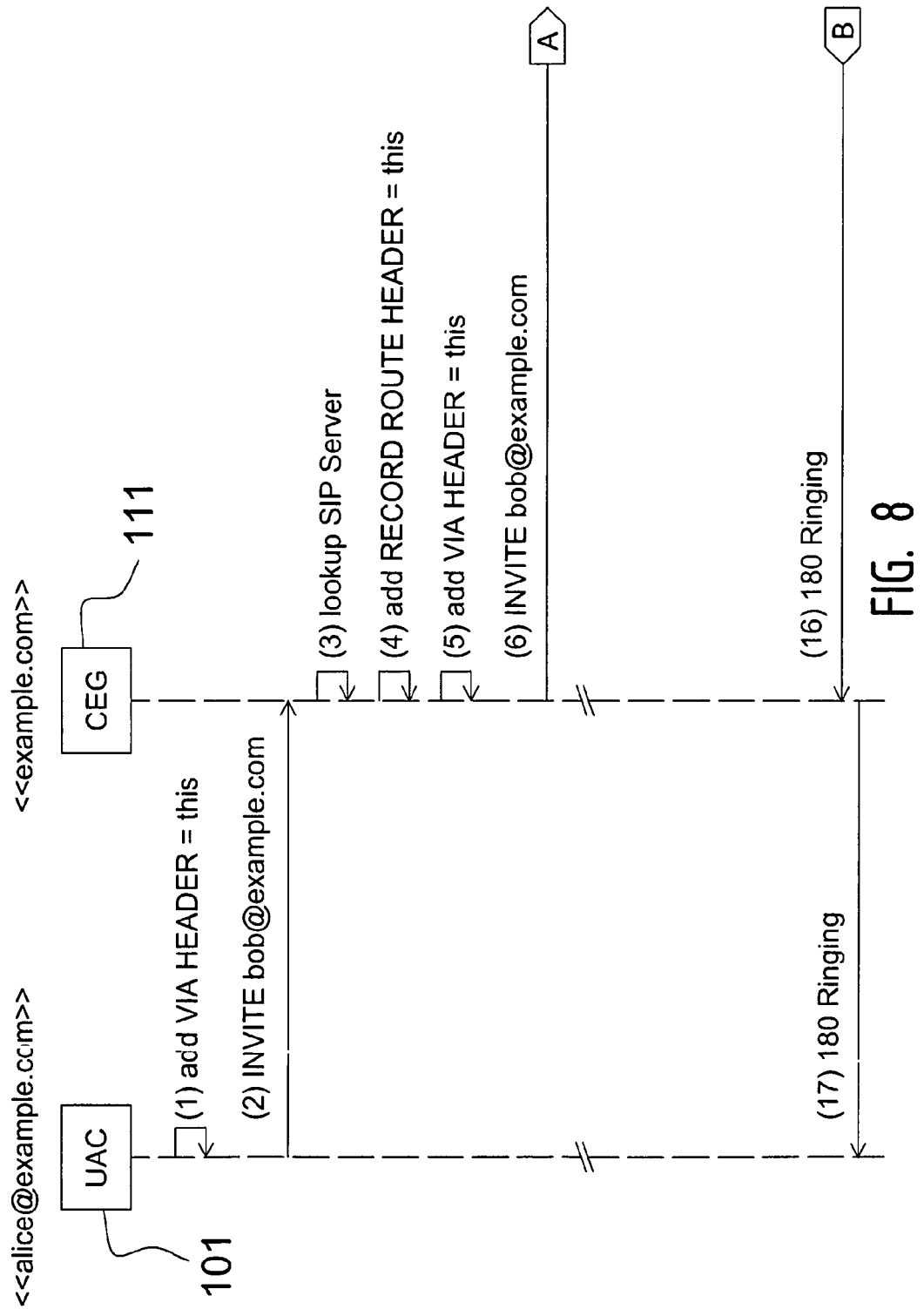
FIG. 8 illustrates a SIP protocol exchange between a pair of SIP user agents via apparatus according to an embodiment of the present invention.
Figure 8:
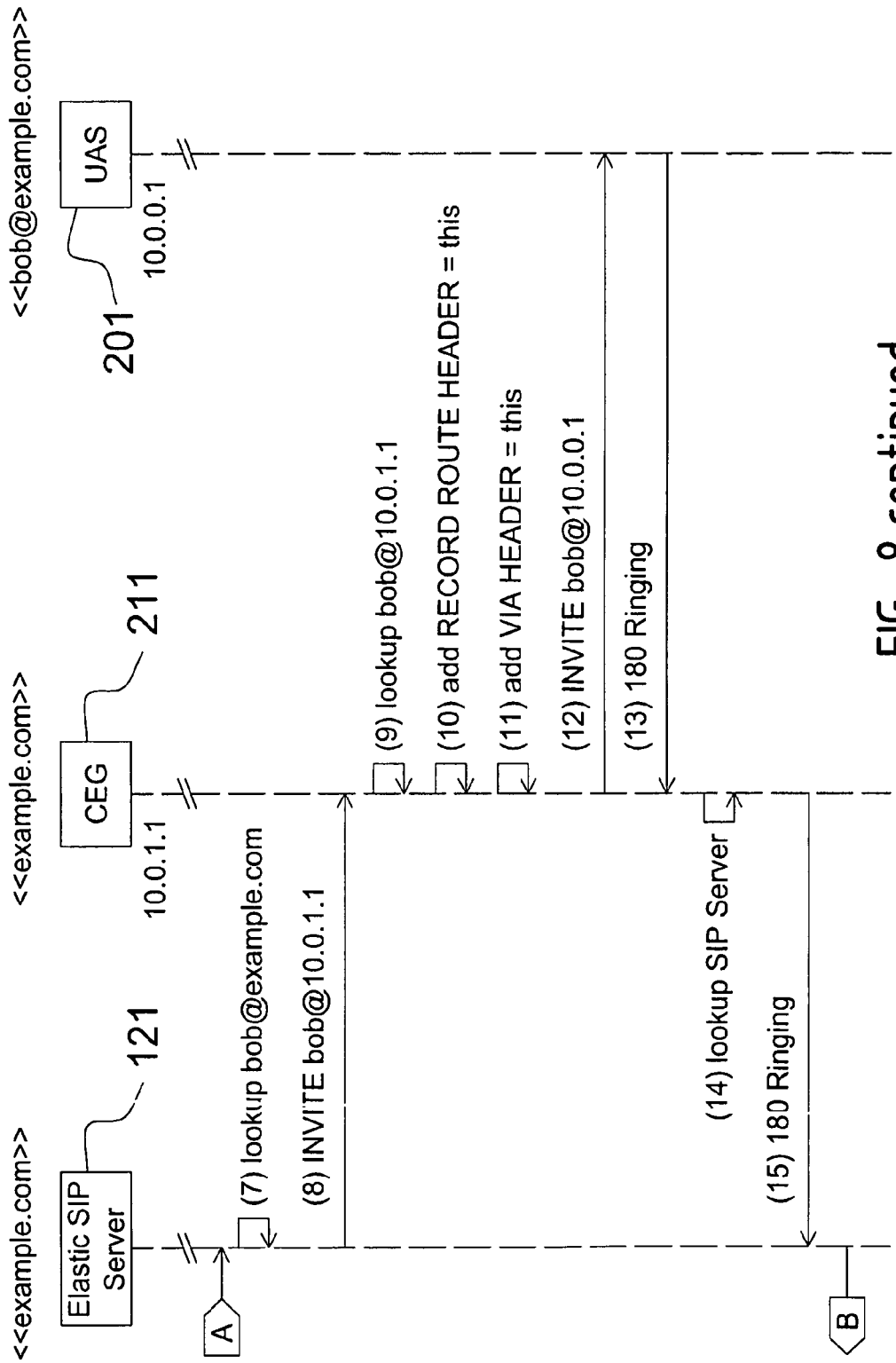
Figure 9:
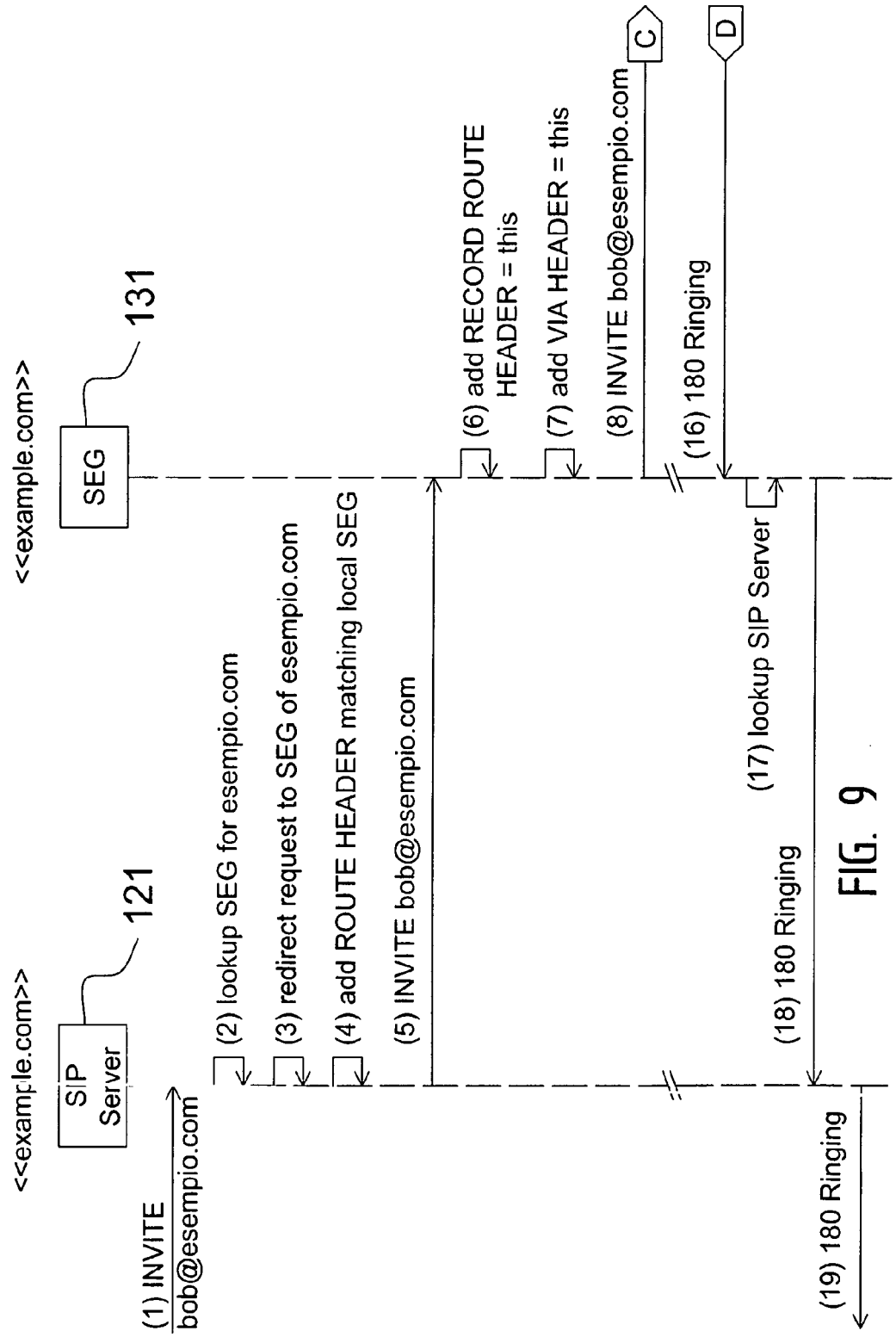
FIG. 9 illustrates a SIP protocol exchange between a pair of SIP servers via apparatus according to another embodiment of the present invention.
Figure 9:
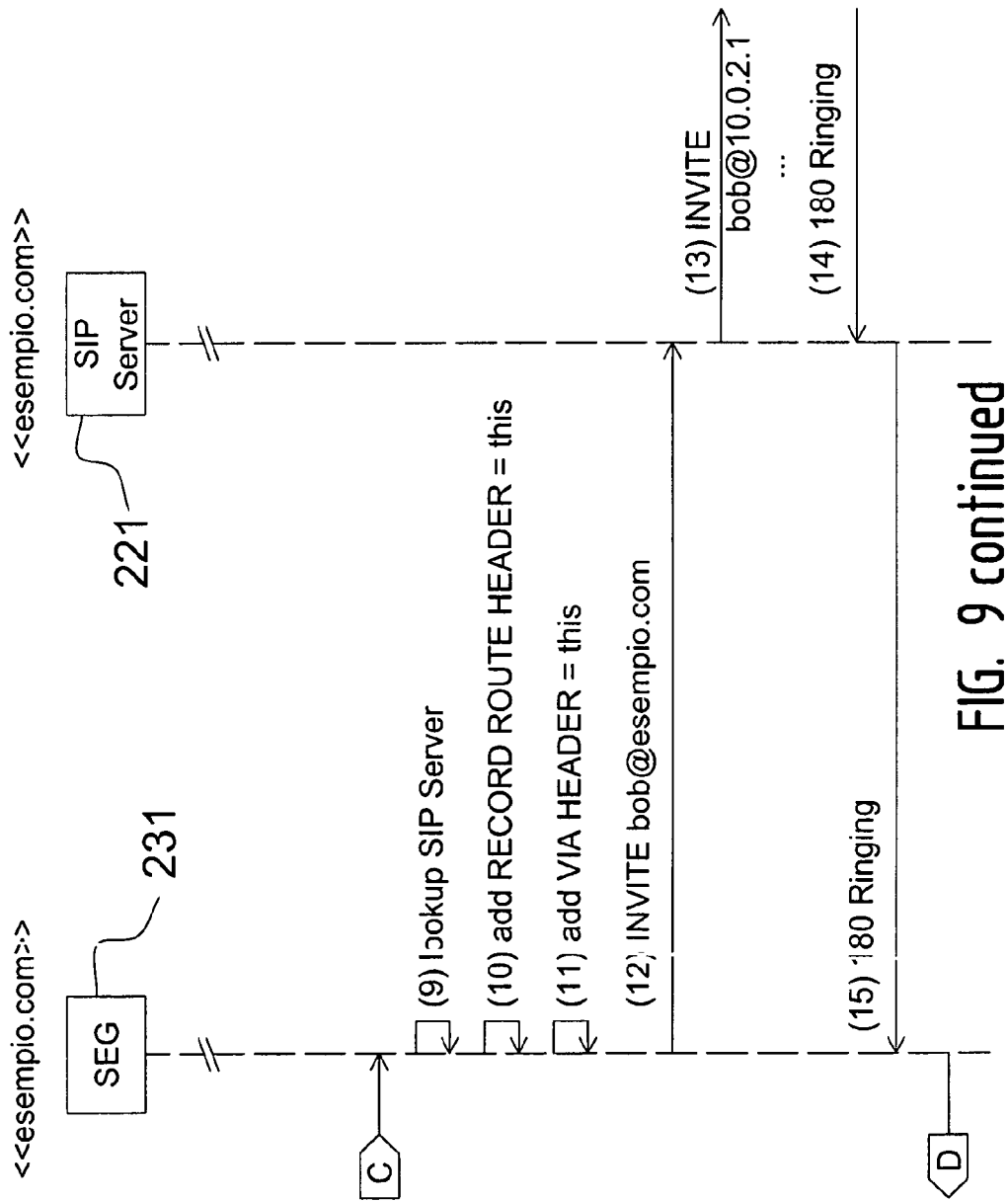

FIG. 8 illustrates a SIP protocol exchange, in particular a call set-up, between a pair of SIP user agents 101, 201 via CEGs 111, 211 according to an embodiment of the present invention.

In a first step, the UA 101 sends an INVITE message to its local CEG 111. The local CEG 111 selects the appropriate SIP server (proxy) 121 to process this request and adds a VIA header and a RECORD-ROUTE header to the request, so as to make sure responses and subsequent requests belonging to the same SIP dialog will go through the CEG 111 as well.

The selected SIP server 121 then processes the INVITE message, and searches for the address of the callee 201.

Since the contact header of the callee 201 was replaced with the address of its local CEG 211, the SIP server 121 forwards the INVITE request to this CEG 211. When receiving this request, the CEG 211 determines the local address of the callee 201 (by decoding its address from the contact header, or by doing a local lookup), adds VIA and RECORD-ROUTE headers, and finally forwards the request to the UA 201.

The UA response of the callee 201 will be sent back to its local CEG 211, which selects the appropriate SIP server (proxy) 121 to process the response. The SIP server then delivers the response to the CEG 111 of the caller (according to the VIA headers), which in turn forwards the response to the caller's UA 101 (again according to the VIA headers).

Note that the SIP server 121 that has processed the prior (INVITE) request, normally also processes the response. If the associated dialog has been transferred to another SIP server due to an elasticity decision, the CEG 211 routes the response to the SIP server (122 or 123, not illustrated in FIG. 4) that has taken over that dialog. This is precisely a benefit of terminating the elasticity message exchanges in the CEGs 111-211: the UAs 101-102 can go about their business as if they are communicating through the same SIP server the whole time, while the decoupled cluster is free to reorganize calls according to any occurring traffic engineering and/or network management needs.

The SIP Server Elasticity Gateway (SIP SEG) 131 is provided to decouple SIP servers 121-123 from peers 221-223 that are non-elastic or that belong to a different domain. Every domain accommodates one or more SEG instances 131, 231 that are able to re-route incoming requests whenever needed (e.g. because some dialogs have been transferred from server A towards server B before releasing server A). FIG. 9 illustrates a SIP protocol exchange between a pair of SIP servers via apparatus according to another embodiment of the present invention, in particular the forwarding of an INVITE message from a SIP server in domain "example.com" towards its counterpart in domain "esempio.com".

The SIP server 121 in domain "example.com" first resolves a

SEG 231 of domain "esempio.com" (e.g. using DNS). Next, it resolves a SEG 131 that belongs to its own domain (the message needs to leave "example.com" via this SEG 131, such that it can re-route incoming responses if needed). The SIP server 121 then forwards the INVITE message to this SEG 131 (which belongs to "example.com"), including the instruction to forward the message to the SEG 231 of "esempio.com" (e.g. by adding a ROUTE header).

Next, the SEG 131 of "example.com" forwards the message to the SEG 231 of "esempio.com" after adding a VIA and a RECORD-ROUTE header pointing to its own network address. The SEG 231 of "esempio.com" then searches for the appropriate SIP server (not shown) to process this request, and forwards the request to that server. This is similar to the way in which a server instance would be selected by a CEG.

The response traverses the inverse path. The path that has been established will be used by other SIP requests (from both UAs) belonging to the same SIP dialog.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. An apparatus for interconnecting a user agent to a cluster of servers, the apparatus comprising:
   at least one processor and associated memory;
   a first communication interface configured to interface with a user agent; and
   a second communication interface configured to interface with a cluster of servers;
   wherein the at least one processor includes a first protocol agent configured to exchange first messages pertaining to a SIP session with said user agent via the first communication interface according to a SIP protocol such that said apparatus acts as a User Agent Server to the user agent;
   wherein the at least one processor includes a second protocol agent configured to exchange second messages pertaining to the SIP session with a selected server from among said cluster of servers via the second communication interface according to the SIP protocol such that said apparatus acts as a User Agent Client to the selected server;
   wherein the at least one processor is configured to relay messages from among said first messages and said second messages between said first protocol agent and said second protocol agent;
   wherein said second protocol agent is further configured to terminate elasticity control messages received from said cluster of servers via the second communication interface;
   wherein the at least one processor is configured to continue the relaying as long as the SIP session requires it;
   wherein the at least one processor is configured to update interconnections associated with the relaying based at least in part on the elasticity control messages during the SIP session.

2. The apparatus according to claim 1, wherein the at least one processor is configured to select said selected server from among said cluster of servers in accordance with a load balancing scheme.

3. The apparatus according to claim 1, wherein the at least one processor is configured to select another server from among said cluster of servers in the event of a failure of said selected server.

4. The apparatus according to claim 1, wherein the at least one processor is configured to conceal the cluster of servers from the user agent and to dynamically update the interconnections in response to the elasticity control messages without compromising the ongoing SIP session.

5. An apparatus for interconnecting a cluster of servers to a SIP server, the apparatus comprising:
   at least one processor and associated memory;
   a first communication interface configured to interface with a cluster of servers; and
   a second communication interface configured to interface with a SIP server;
   wherein the at least one processor includes a first protocol agent configured to exchange first messages pertaining to a SIP session with a selected server from among said cluster of servers via the first communication interface according to a SIP protocol such that said apparatus acts as a peer User Agent Server to the selected server;
   wherein the at least one processor includes a second protocol agent configured to exchange second messages pertaining to the SIP session with a SIP server via the second communication interface according to the SIP protocol such that said apparatus acts as a next hop User Agent Server to the SIP Server;
   wherein the at least one processor is configured to relay messages from among said first messages and said second messages between said first protocol agent and said second protocol agent;
   wherein said first protocol agent is further configured to terminate elasticity control messages received from said cluster of servers via the first communication interface;
   wherein the at least one processor is configured to continue the relaying as long as the SIP session requires it;
   wherein the at least one processor is configured to update interconnections associated with the relaying based at least in part on the elasticity control messages during the SIP session.

6. The apparatus according to claim 5, wherein the at least one processor is configured to select said selected server from among said cluster of servers in accordance with a load balancing scheme.

7. The apparatus according to claim 5, wherein the at least one processor is configured to select another server from among said cluster of servers in the event of a failure of said selected server.

8. The apparatus according to claim 5, wherein the at least one processor is configured to conceal the cluster of servers from the SIP server and to dynamically update the interconnections in response to the elasticity control messages without compromising the ongoing SIP session.

9. The apparatus according to claim 5, wherein characteristics of the SIP server include at least one of being a non-elastic server and being associated with a different domain than a domain associated with the cluster of servers.

10. A method for interconnecting a user agent to a selected server from among a cluster of servers, said method comprising:
    exchanging first messages pertaining to a SIP session with a user agent from a Client Elasticity Gateway device according to a SIP protocol, such that said Client Elasticity Gateway device acts as a User Agent Server to the user agent;
    exchanging second messages pertaining to the SIP session between the Client Elasticity Gateway device and a selected server according to the SIP protocol, such that said Client Elasticity Gateway device acts as a User Agent Client to the selected server, the selected server having been selected from among the cluster of servers;
    relaying messages from among the first messages and the second messages such that payloads of incoming first messages are transferred to outgoing second messages and vice versa; and
    terminating elasticity control messages received from said cluster of servers at the Client Elasticity Gateway device;
    wherein the relaying persists as long as the SIP session requires it;
    wherein interconnections at the Client Elasticity Gateway device associated with the relaying are updated based at least in part on the elasticity control messages during the SIP session.

11. The method according to claim 10, further comprising selecting said selected server from among said cluster of servers in accordance with a load balancing scheme.

12. The method according to claim 10, further comprising providing fail-over support by selecting another server from among said cluster of servers in the event of a failure of said selected server.

13. The method according to claim 10, wherein the Client Elasticity Gateway device is configured to conceal the cluster of servers from the user agent and to dynamically update the interconnections in response to the elasticity control messages without compromising the ongoing SIP session.

14. A method for interconnecting a first server to a selected one from among a cluster of servers, said method comprising:
   exchanging first messages pertaining to a SIP session with a first server from a Server Elasticity Gateway device according to a SIP protocol such that the Server Elasticity Gateway device acts as a next hop User Agent Server to the first server;
   exchanging second messages pertaining to the SIP session between the Server Elasticity Gateway device and a selected server according to the SIP protocol such that the Server Elasticity Gateway device acts as a peer User Agent Server to the selected server, the selected server having been selected from among the cluster of servers;
   relaying messages from among the first messages and the second messages such that payloads of incoming first messages are transferred to outgoing second messages and vice versa; and
   terminating elasticity control messages received from said cluster of servers at the Server Elasticity Gateway device;
   wherein the relaying persists as long as the SIP session requires it;
   wherein interconnections at the Server Elasticity Gateway device associated with the relaying are updated based at least in part on the elasticity control messages during the SIP session.

15. The method according to claim 14, further comprising selecting said selected server from among said cluster of servers in accordance with a load balancing scheme.

16. The method according to claim 14, further comprising providing fail-over support by selecting another server from among said cluster of servers in the event of a failure of said selected server.

17. The method according to claim 14, wherein the Server Elasticity Gateway device is configured to conceal the cluster of servers from the first server and to dynamically update the interconnections in response to the elasticity control messages without compromising the ongoing SIP session.

18. The method according to claim 14, wherein characteristics of the first server include at least one of being a non-elastic server and being associated with a different domain than a domain associated with the cluster of servers.

19. A non-transitory computer-readable medium storing program instructions that, when executed by a processor, cause a processor-controlled Client Elasticity Gateway device to perform the method of claim 10.

20. A non-transitory computer-readable medium storing program instructions that, when executed by a processor, cause a processor-controlled Server Elasticity Gateway device to perform the method of claim 14.

* * * * *